United States Patent [19]
Boudreau, Jr., deceased

[11] 3,858,478

[45] Jan. 7, 1975

[54] CONCRETE FASTENER

[76] Inventor: John J. Boudreau, Jr., deceased, 82 Breed St., late of East Boston, Mass. by Phyllis V. Boudreau, administratrix

[22] Filed: Aug. 24, 1972

[21] Appl. No.: 283,374

[52] U.S. Cl. .................................. 85/10 E, 85/28
[51] Int. Cl. ............................................. F16b 15/02
[58] Field of Search ............ 85/10, 10 E, DIG. 1, 28

[56] References Cited
UNITED STATES PATENTS

| 376,791 | 1/1888 | Sweet | 85/28 |
| 2,724,116 | 11/1955 | Termet | 85/10 E |
| 2,761,348 | 9/1956 | Williams et al. | 85/10 E |
| 2,855,817 | 10/1958 | Kope | 85/10 E |
| 3,208,330 | 9/1965 | Baum et al. | 85/28 |
| 3,320,845 | 5/1967 | Eschweiler | 85/10 E |
| 3,408,891 | 11/1968 | Hartmann | 85/10 E |

FOREIGN PATENTS OR APPLICATIONS

| 184,524 | 1/1956 | Austria | 85/10 E |
| 565,770 | 4/1958 | Belgium | 85/10 E |
| 616,559 | 3/1961 | Canada | 85/102 |

OTHER PUBLICATIONS

Page 156 from Popular Science, December 1956 issue, Vol. 169, No. 6.

Primary Examiner—Marion Parsons, Jr.
Attorney, Agent, or Firm—Wolf, Greenfield & Sacks

[57] ABSTRACT

A fastener for driving into hard material such as concrete, stone, or brick includes a nail having a rounded head and an improved washer initially positioned about the shank of the nail at an end of the nail remote from the head. An impact tool having a nail driving attachment is used to drive the nail through the washer as the nail pierces the material.

3 Claims, 7 Drawing Figures

Patented Jan. 7, 1975   3,858,478

CONCRETE FASTENER

BACKGROUND OF THE INVENTION

The present invention relates generally to fasteners that are driven into hard materials such as cement, and is more particularly concerned with a novel nail and associated washer preferably adapted for use with an impact tool having a nail driving attachment.

Fasteners used in the building trades for cement or other hard materials have not been altogether, successfully utilized for one reason or another. Some of these problems have been associated with the impacting or driving tool for the fastener. However, others of the problems relate to the design of the fastener itself. For example, the head is usually positioned within a receiving channel of the driving tool, and the head sometimes causes scoring of the walls defining the channel, and eventually at least part of the driving tool has to be replaced. Also, the conventional cylindrical shape of the nail head makes it difficult to position the nail in the channel especially when the head and channel diameters are quite close.

Another drawback associated with the conventional fasteners is that the washer tends to rotate relative to the nail under impact, making it generally difficult to pierce the material with the nail.

Accordingly, it is one important object of the present invention to provide a fastener including a nail and associated washer, which easily passes into the channel in the impacting tool and does not score the walls of the channel as the impacting tool is operated.

Another object of the present invention is to provide a fastener including a nail and associated washer wherein the washer tends to score the nail slightly as the nail pierces the washer and inhibits rotation of the washer relative to the nail as the impacting tool is operated.

A further object of the present invention is to provide a fastener in accordance with the preceding objects that is relatively simple in construction, durable, readily produced in large quantities, and can be fabricated relatively inexpensively.

SUMMARY OF THE INVENTION

To accomplish the foregoing and other objects of the present invention the fastener comprises an elongated nail having a taper at one end and a head at the other end, and a washer initially disposed about the nail at or near the tapered end of the nail. One feature of the present invention resides in the rounded head of the nail which enables the nail to pass easily into the channel of the impacting tool and prevents scoring of the channel walls when the tool is operated. Another feature of the present invention resides in the particular configuration of the washer, which preferably includes a plurality of wings defining the inner diameter of the washer, which wings tend to score the nail as the nail pierces the washer preventing relative rotational movement of the washer and nail.

BRIEF DESCRIPTION OF THE DRAWINGS

Numerous other objects, features and advantages of the invention will become apparent upon a reading of the following detailed description taken in conjunction with the accompanying drawings in which.

DETAILED DESCRIPTION

Figure 1:
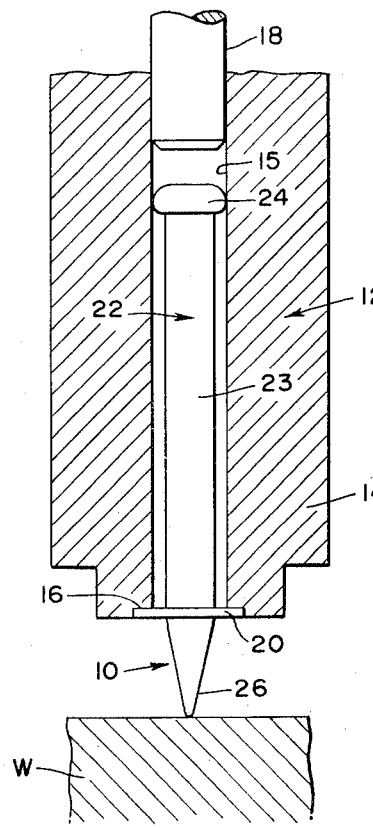
FIG. 1 is a cross-sectional view showing the fastener in position in an impacting tool.

Referring now to the drawings and in particular to FIG. 1, there is shown a cross-sectional view of the fastener 10 and a part of an impacting tool 12. The impacting tool 12 includes a body end 14 defining a channel 15 for receiving the fastener 10. Body end 12 also includes a counterbore 16 for receiving washer 20 of the fastener 10. The channel 15 is shown as containing the end of a driver 18 which operates to drive the fastener into the work material W.

FIG. 1 shows the fastener 10 as including a washer 20 and nail 22. The nail includes an elongated shank 23, head 24, and a tapered end 26. The washer is positioned near tapered end 26 and has an inner diameter slightly smaller than the diameter of shank 23 so that the washer 20 will slide up tapered end 26 but cannot be slid easily along shank 23.

Figure 2:
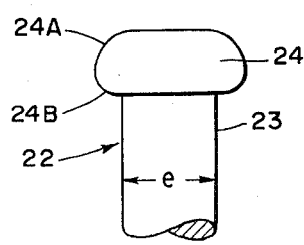
FIG. 2 is an enlarged view of the head of the nail.

FIG. 2 shows an enlarged view of the head 24 of nail 22. The head 24 is rounded at 24A so that the nail will slide easily into channel 15 in the impacting tool. The head 24 is also rounded at 24B at a slightly smaller radius than at 24A so that the head will not score the channel walls as the fastener is driven into the work material W.

Figure 3:
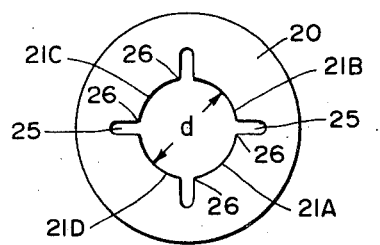
FIG. 3 is a plan view of the washer.

Washer 20 is shown in plan view in FIG. 3. The washer, as well as the nail 22, may be fabricated of case hardened cold roll steel or similar metal. The washer 20 has an outer diameter that corresponds with the diameter of counterbore 16 and has an inner diameter $d$ that is slightly smaller than the diameter $e$ of nail shank 23 indicated in FIG. 2. The inner diameter of washer 20 is defined by four wings 21A, 21B, 21C, and 21D. The wings are in turn defined by the V-shaped slots 25 cut from the inner diameter of the washer. Each of the wings has a pair of pointed ends 26 that tend to score the shank 23 of the nail as the nail is driven through washer 20. The inner diameter of the washer 10 between the points 26 of each wing may also tend to score the nail.

Figure 4:
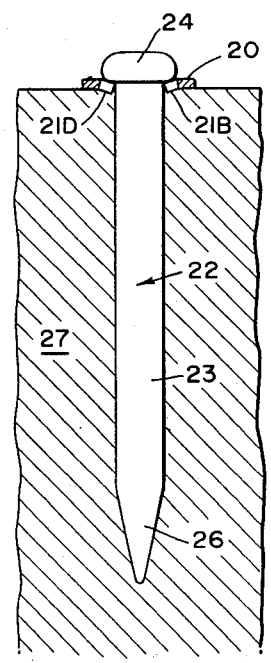
FIG. 4 is a cross-sectional view taken through the fastener after it has been driven into the material.

FIG. 4 shows the washer and nail in their final position having been driven into work material w. It is noted in FIG. 4 that the wings 21B and 21D, for example, due to the inner diameter $d$ of the washer, become bent downwardly during the impacting operation preventing relative rotational movement between washer 20 and nail 22. The wings also provide a counterbore in the surface of the work, which receives the head of the nail.

Figure 5A:
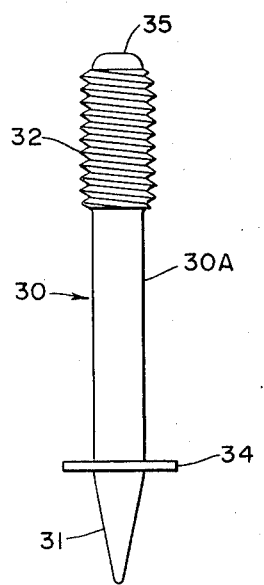
FIGS. 5A, 5B and 5C show alternate forms of the fastener.
Figure 5B:
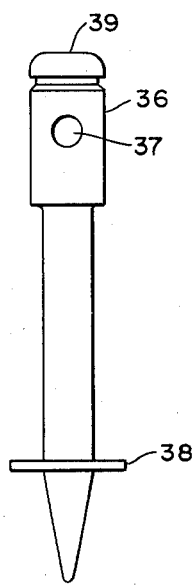
Figure 5C:
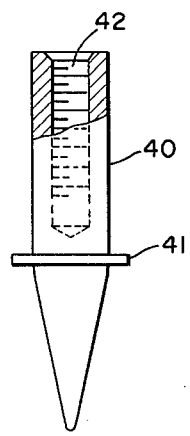

FIGS. 5A, 5B and 5C show alternate embodiments of the present invention. In FIG. 5A there is shown a nail 30 having a tapered end 31 and a screw threaded top portion 32 of greater diameter than shank 30a. The threaded portion describes a threaded post when the fastener is driven into the work. This embodiment also includes a washer 34 similar to the one shown in FIG. 3 and further has a head 35 similar to but smaller than the head of the nail shown in FIG. 2.

The embodiment of FIG. 5B is similar to that shown in FIG. 5A but includes a cylindrical, non-threaded portion 36 in place of the threaded portion 32, and has an aperture 37 extending through portion 36. This particular embodiment may be used in ceiling construction where the aperture 37 is provided to accommodate a rod or wire for hanging the ceiling. The embodiment of FIG. 5B includes a washer 38 like that shown in FIG. 3 and a head 39 like that shown in FIG. 2.

The embodiment of FIG. 5C shows a nail 40 having a slightly enlarged diameter than the shank of nail 10 and a washer 41 slightly larger than washer 20. Nail 40 is larger in diameter so that it can be provided with a counterbore as shown in FIG. 5C by the cut away top portion 42. When the fastener is driven in place a screw or the like may be threaded into the counterbore.

Having described certain embodiments of the present invention, it should now become apparent that other embodiments of the invention including modifications thereof and departures therefrom should now become apparent to one skilled in the art and are all contemplated as falling within the spirit and scope of the present invention as defined by the following claims.

What is claimed is:

1. A fastener for piercing a hard material by the use of an impacting member comprising;

an elongated nail having a shank portion of constant diameter with a taper at one end and a head at the other end, and a flat washer disposed about the nail at the one end thereof, said washer having means defining a plurality of inwardly extending wings defining scoring means for preventing rotation of said nail, said head being rounded about its circumference and having a diameter of smaller dimension than the transverse extent of said washer, said head defining an outer diameter along a plane perpendicular to said shank and defining a first rounded edge of first radius and a second rounded edge of second radius in a second plane perpendicular to said first plane, said second radius being different than said first radius and the edges of said first and second radii meeting at said first plane.

2. A fastener as set forth in claim 1 wherein said washer has means defining four inwardly extending wings defining the inner diameter of said washer.

3. A fastener as set forth in claim 1 wherein said second radius is smaller than said first radius and is on a side of said head closest to said one end of said shank.

* * * * *